United States Patent
Puryk et al.

(10) Patent No.: US 11,744,177 B2
(45) Date of Patent: Sep. 5, 2023

(54) CROSS VENTED RESIDUE DISPOSAL SYSTEM FOR AN ENCLOSED COMBINE BODY

(71) Applicant: DEERE & COMPANY, Moline, IL (US)

(72) Inventors: Corwin M. Puryk, Bettendorf, IA (US); Volker Fuchs, Bettendorf, IA (US); Peter Mischler, Kaiserslautern (DE); Gregor Diessner, Schweigen-Rechtenbach (DE); Martin Rittershofer, Kaiserslautern (DE); Oliver Klein, Saarlouis (DE)

(73) Assignee: DEERE & COMPANY, Moline, IL (US)

( * ) Notice: Subject to any disclaimer, the term of this patent is extended or adjusted under 35 U.S.C. 154(b) by 831 days.

(21) Appl. No.: 16/705,915

(22) Filed: Dec. 6, 2019

(65) Prior Publication Data
US 2020/0107499 A1    Apr. 9, 2020

Related U.S. Application Data

(62) Division of application No. 15/621,160, filed on Jun. 13, 2017, now Pat. No. 10,499,566.

(51) Int. Cl.
*A01D 41/12*      (2006.01)
*A01F 12/40*      (2006.01)
(Continued)

(52) U.S. Cl.
CPC ..... *A01D 41/1243* (2013.01); *A01D 41/1276* (2013.01); *A01D 90/06* (2013.01);
(Continued)

(58) Field of Classification Search
CPC . A01D 41/1243; A01D 41/1276; A01F 12/40; A01F 12/444
See application file for complete search history.

(56) References Cited

U.S. PATENT DOCUMENTS

| | | |
|---|---|---|
| 2,626,159 A | 1/1953 | Thompson |
| 3,521,687 A | 7/1970 | Gaeddert |

(Continued)

FOREIGN PATENT DOCUMENTS

| | | |
|---|---|---|
| EP | 0595382 A1 | 5/1994 |
| EP | 1757183 A1 | 2/2007 |

(Continued)

*Primary Examiner* — Alicia Torres
(74) *Attorney, Agent, or Firm* — Taft Stettinius & Hollister LLP; Stephen F. Rost

(57) ABSTRACT

A combine harvester includes a housing having a rear hood and defining an interior, a blower for generating an air stream in a substantially rearward direction, and a cleaning system separating residue from a crop material such that the residue is transported via the air stream rearwardly to be discharged from the housing. A chopper rotor assembly is disposed within the interior below the rear hood and includes a chopper rotor having a plurality of blades for chopping the residue as it is received via the air stream. A chopper housing is disposed within the interior and defines an inlet of the chopper rotor for receiving the residue and an outlet spaced rearward from the chopper rotor for discharge of the chopped residue from the interior of the housing. An air gap through which the air stream may exit the interior is defined between the rear hood and chopper rotor.

18 Claims, 7 Drawing Sheets

(51) Int. Cl.
*A01D 41/127* (2006.01)
*A01D 90/06* (2006.01)
*A01F 12/44* (2006.01)
*B07B 1/52* (2006.01)

(52) U.S. Cl.
CPC ............ *A01F 12/40* (2013.01); *A01F 12/444* (2013.01); *B07B 1/528* (2013.01)

(56) References Cited

U.S. PATENT DOCUMENTS

| | | |
|---|---|---|
| 3,669,123 A | 6/1972 | Gaeddert et al. |
| 6,840,854 B2 | 1/2005 | Redekop |
| 7,008,315 B2 | 3/2006 | Redekop et al. |
| 7,354,341 B1 | 4/2008 | Smith et al. |
| 7,544,126 B2 | 6/2009 | Lauer et al. |
| 8,118,651 B2 | 2/2012 | Weichholdt et al. |
| 2002/0119809 A1 | 8/2002 | Bognar et al. |
| 2004/0043804 A1 | 3/2004 | Redekop |
| 2005/0101363 A1 | 5/2005 | Farley et al. |
| 2008/0305841 A1 | 12/2008 | Overschelde et al. |
| 2016/0135377 A1 | 5/2016 | Ballegeer et al. |
| 2022/0346313 A1* | 11/2022 | Passchyn ................ A01F 12/40 |

FOREIGN PATENT DOCUMENTS

| | | |
|---|---|---|
| GB | 313182 A | 6/1929 |
| WO | 8800432 A1 | 1/1988 |

* cited by examiner

CROSS VENTED RESIDUE DISPOSAL SYSTEM FOR AN ENCLOSED COMBINE BODY

RELATED APPLICATIONS

This application is a divisional of U.S. patent application Ser. No. 15/621,160, filed Jun. 13, 2017, the disclosure of which is hereby incorporated by reference in its entirety.

FIELD OF THE DISCLOSURE

The present disclosure relates to a combine, and in particular, to a residue disposal system of an enclosed combine body.

BACKGROUND

Agricultural machines, such as a combine, include different portions or sections for moving crop therethrough. For example, a conventional combine may include a cleaning shoe or system that is located between the wheels of the combine, behind the cab and below the engine. The design of the cleaning system is such that a large fan or blower provides air driven upward therefrom. The cleaning system may include grating in the form of a large cylindrical or semi-circular body through which grain and other residue falls through and onto a cleaning shoe (or sieve). Air from the blower is generated upward through the flat grating and cleaning shoe and lifts material other than grain ("MOG") such as straw and carries the material to the rear of the combine on a flow of air. Grain that falls through a large flat screen of the cleaning system may collect near a bottom of the combine where it is lifted up by the air flow and deposited into a grain tank. The MOG is further carried by the air flow over the top of the sieve and to the rear of the combine where it is deposited onto the underlying ground. In effect, this performs the cleaning function of the combine. The MOG, which is carried by the air flow to the rear of the combine, may be spread on the ground or otherwise deposited on the ground in a narrow windrow or swath where it is later picked up.

The combine further includes a straw chopper or chopper assembly located between the sieve and the rear outlet of the combine. The chopper assembly may be formed by a large cylinder with blades or knives protruding therefrom, thereby forming a chopper rotor. The chopper assembly rotates and shreds or chops the residue or MOG before it exits the combine.

During operation, the blower generates a substantial amount of air flow to carry the MOG to the chopper assembly. The amount of air generated by the blower is significant, and in effect it can cause back pressure inside the combine if it is unable to escape or vent from the enclosed combine body. Conventional combine designs include vents upstream of the chopper assembly to allow air to vent or escape from the combine to reduce back pressure.

One such example of venting air is described in U.S. Pat. No. 7,008,315 to Redekop Chaff Systems Ltd. (hereinafter "the '315 patent"). The '315 patent describes a chopper housing formed by side walls at opposite sides of a combine hood. The housing further includes a top wall and a bottom wall that define an inlet which straw and other material passes through to a chopper rotor. As shown in FIG. 2 of the '315 patent, the top wall of the housing includes a vertical portion which extends downwardly and a curved section that extends around the top of the rotor to a rear edge which is directly to the rear of the rotor. In other words, the '315 patent shows and describes a shroud or metal sheet which is formed around or circumscribes all sides, including the rear or back side, of the chopper rotor. Due to a buildup of back pressure in the combine, the '315 patent further illustrates and describes a combine with rear vents and side vents defined in the chopper housing. The vents form a series of horizontal parallel slots and consist of louvers that are angled outwards and upwards. Moreover, the vents are above and forward of the inlet of the chopper housing so as to act on the air in advance of the materials entering the inlet of the chopper rotor. Thus, the '315 patent describes a combine in which air is permitted to vent or escape from the combine at a location above and upstream of the chopper rotor.

In addition to the rear vents and side vents, the '315 patent further describes the chopper rotor as including a hub with a plurality of radially extending blades which rotate and are arranged across the width of the chopper rotor. The blades are configured to generate an air flow by pushing the air rearward toward an outlet of the rotor housing. During operation, the blades rotate about the hub and push the air to follow a generally circular path around the chopper rotor.

Combine harvester designs similar to the one described in the '315 patent, however, have been found to restrictive to air flow. The vents upstream of the chopper rotor facilitate some venting, but there is still an issue with back pressure building in the combine even with these vents. Moreover, air flow is further restricted with chopper rotor housings similar to the one in the '315 patent in which sheet metal or a shroud is formed in close proximity around the top and rear of the chopper rotor. Due to the close proximity of the shroud to the blades of the chopper rotor, the air flow is configured to follow the rotational path of the blades. Although the blades, which may be formed like paddles or fan blades, facilitate some air flow through an outlet of the chopper housing, the air flow is still restricted by the design of the chopper housing and the fan blades cause some of the air to flow forward back into the combine thus building back pressure. Thus, there is a need for a less restrictive chopper housing design that facilitates better air flow through an outlet of the chopper housing and which reduces back pressure in the combine.

SUMMARY

In one embodiment of the present disclosure, a combine harvester includes a housing including a rear hood and opposite side walls which define an interior; a blower disposed in the interior of the housing, the blower configured to generate an air stream in a substantially rearward direction; a cleaning system disposed in the interior at a location rearward from the blower, the cleaning system separating residue from a crop material such that the residue is transported via the air stream rearwardly to be discharged from the housing; a chopper rotor assembly disposed within the interior at a location below the rear hood of the housing, the chopper rotor assembly including a chopper rotor mounted about a hub for rotation about an axis defined by the hub and a plurality of blades coupled to the hub of the chopper rotor for chopping the residue as it is received via the air stream; and a chopper housing disposed within the interior and defining an inlet opening of the chopper rotor assembly for receiving the residue being transported via the air stream from the cleaning system, the chopper housing further including an outlet spaced rearward from the chopper rotor for discharge of the chopped residue from the interior of the housing; wherein, the air stream generated by the blower flows out of the interior via at least a first flow path and a second flow path, the first flow path being defined through the chopper rotor such that a first portion of the air stream flows via the first flow path through the chopper rotor without being substantially affected by the plurality of blades of the chopper rotor as the first portion of the air stream flows in the rearward direction; wherein, the second flow path is defined by a space between the rear hood and the chopper rotor such that a second portion of the air stream flows via the second flow path through the space and above the chopper rotor.

In a first example of this embodiment, the chopper housing may include a floor and a pair of side walls opposite one another but is open at the top and rear of the chopper rotor to permit the air stream to flow substantially unrestricted out of the interior. In a second example, the rear hood may be free of any opening or vent such that the air flow is directed rearward via the rear hood without escaping from the interior upstream of the chopper rotor. In a third example, the side walls and rear hood of the housing do not include any vents upstream of the chopper rotor for venting the air stream from the interior.

In a fourth example, each of the plurality of blades is substantially straight and includes a substantially flat profile so as to chop the residue without producing an additional air stream as the chopper rotor rotates about the hub. In a fifth example, the chopper rotor does not include any fan blades coupled to the hub. In a sixth example of this embodiment, at least one fan blade may be coupled to the hub of the chopper rotor, where the at least one fan blade includes a bent portion for generating an additional air stream in the interior of the housing. In another example, a residue deflector may be pivotably coupled to the side walls of the housing at a location rearward of the rear hood and above the chopper rotor, where the residue deflector is pivotable between at least a first position and a second position. In a related example, the residue deflector is oriented in a downward and forward direction in the first position, and in a rearward direction in the second position.

In a further example, a residue deflector may include a rod pivotably coupled to the side walls of the combine and a plurality of tines depending from the rod and into the space defined between the rear hood and the chopper rotor. The plurality of tines may be spaced from one another along a width of the residue deflector to allow the second portion of the air stream to flow via the second flow path between the plurality of tines. In yet a further example, the combine harvester may include a mounting bracket for coupling one end of the rod to a first side wall of the housing and a detent plate for coupling the other end of the rod to a second side wall of the housing. The detent plate may include at least a first detent position and a second detent position in which the rod is disposed corresponding to the first position and second position, respectively, of the residue deflector. In this example, a handle may be coupled to the rod for manipulating the residue deflector between its at least two positions.

In yet another example, the combine harvester may include a controller and an actuator coupled to the rod of the residue deflector. The actuator may be operably controlled by the controller for controlling the pivotable movement of the residue deflector between its at least two positions.

In another embodiment of the present disclosure, a combine harvester includes a housing including a rear hood and opposite side walls which define an interior; a blower disposed in the interior of the housing, the blower configured to generate an air stream in a substantially rearward direction; a cleaning system disposed in the interior at a location rearward from the blower, the cleaning system separating residue from a crop material such that the residue is transported via the air stream rearwardly to be discharged from the housing; a chopper rotor assembly disposed within the interior at a location below the rear hood of the housing, the chopper rotor assembly comprising a chopper rotor mounted about a hub for rotation about an axis defined by the hub and a plurality of blades coupled to the hub of the chopper rotor for chopping the residue as it is received via the air stream; each of the plurality of blades being substantially straight and comprising a substantially flat profile so as to chop the residue without producing an additional air stream as the chopper rotor rotates about the hub; a chopper housing disposed within the interior and defining an inlet opening of the chopper rotor assembly for receiving the residue and an outlet spaced rearward from the chopper rotor for discharge of the chopped residue from the interior of the housing, the chopper housing being substantially open above and to the rear of the chopper rotor; and an air gap defined between a rearmost portion of the rear hood and the chopper rotor; wherein, the air stream generated by the blower flows out of the interior in the rearward direction via at least a first flow path and a second flow path, the first flow path being defined through the chopper rotor such that a first portion of the air stream flows via the first flow path through the chopper rotor without being substantially affected by the plurality of flat profile blades of the chopper rotor, and the second flow path is defined through the air gap above the chopper rotor such that a second portion of the air stream exits the interior via the second flow path.

In a first example of this embodiment, the chopper housing is substantially open above and to the rear of the chopper rotor. In a second example, at least one fan blade is coupled to the hub of the chopper rotor. The at least one fan blade may include a bent portion for generating an additional air stream in the interior of the housing. In a third example, a residue deflector is pivotably coupled to the side walls of the housing at a location rearward of the rear hood and above the chopper rotor. The residue deflector may be pivotable between at least a first position and a second position. In another example, the residue deflector may include a rod pivotably coupled to the side walls of the combine and a plurality of tines depending from the rod and into at least a portion of the air gap above the chopper rotor. The plurality of tines may be spaced from one another along a width of the residue deflector to allow the second portion of the air stream to flow via the second flow path between the plurality of tines.

In a further embodiment of the present disclosure, a combine harvester includes a housing including a rear hood and opposite side walls which define an interior; a blower disposed in the interior of the housing, the blower configured to generate an air stream in a substantially rearward direction; a cleaning system disposed in the interior at a location rearward from the blower, the cleaning system separating residue from a crop material such that the residue is transported via the air stream rearwardly to be discharged from the housing; a chopper rotor assembly disposed within the interior at a location below the rear hood of the housing, the chopper rotor assembly comprising a chopper rotor mounted about a hub for rotation about an axis defined by the hub and a plurality of blades coupled to the hub of the chopper rotor for chopping the residue as it is received via the air stream; and a chopper housing disposed within the interior and defining an inlet opening of the chopper rotor assembly for receiving the residue and an outlet spaced rearward from the chopper rotor for discharge of the chopped residue from the interior of the housing, the chopper housing including a floor, a pair of side walls, and being substantially open above and to the rear of the chopper rotor; an air gap defined between the rear hood and the chopper rotor; and a residue deflector pivotably coupled to the side walls of the housing and depending downwardly into at least a portion of the air gap; wherein, the air stream generated by the blower flows out of the interior in the rearward direction via at least a first flow path and a second flow path, the first flow path being defined through the chopper rotor such that a first portion of the air stream flows via the first flow path through the chopper rotor without being substantially affected by the plurality of flat profile blades of the chopper rotor, and the second flow path is defined through the air gap above the chopper rotor such that a second portion of the air stream exits the interior via the second flow path.

In one example of this embodiment, the residue deflector may include a rod pivotably coupled to the side walls of the combine and a plurality of tines depending from the rod and into the space defined between the rear hood and the chopper rotor. The plurality of tines may be spaced from one another along a width of the residue deflector to allow the second portion of the air stream to flow via the second flow path between the plurality of tines. In another example, each of the plurality of blades is substantially straight and includes a substantially flat profile so as to chop the residue without producing an additional air stream as the chopper rotor rotates about the hub.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
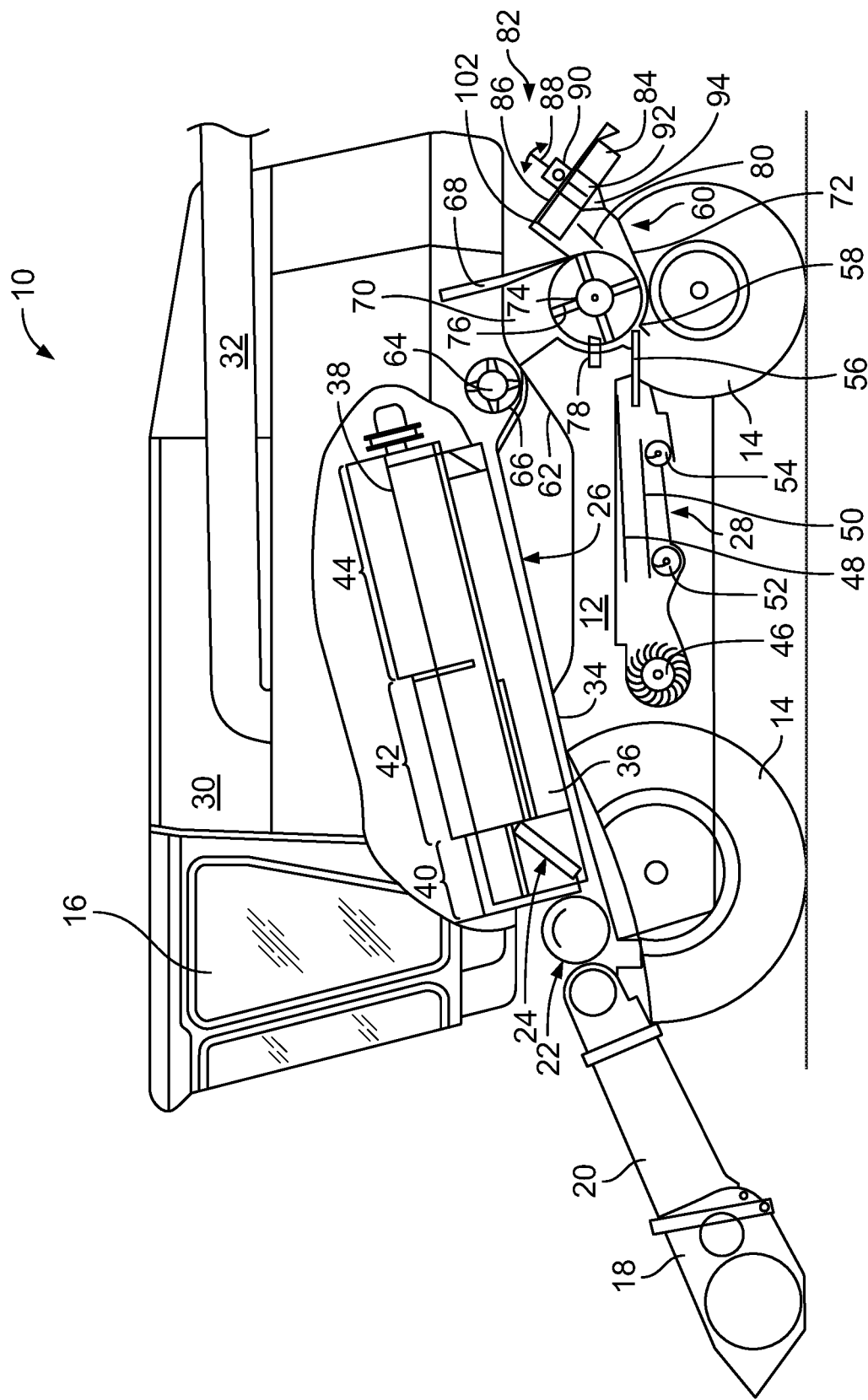
FIG. 1 is a partial section of a side view of a combine with a chopper rotor assembly and cleaning system.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an embodiment of an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls (not shown) for controlling the operation of the combine 10. A cutter head 18 is disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by means of an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by means of an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

Figure 2:
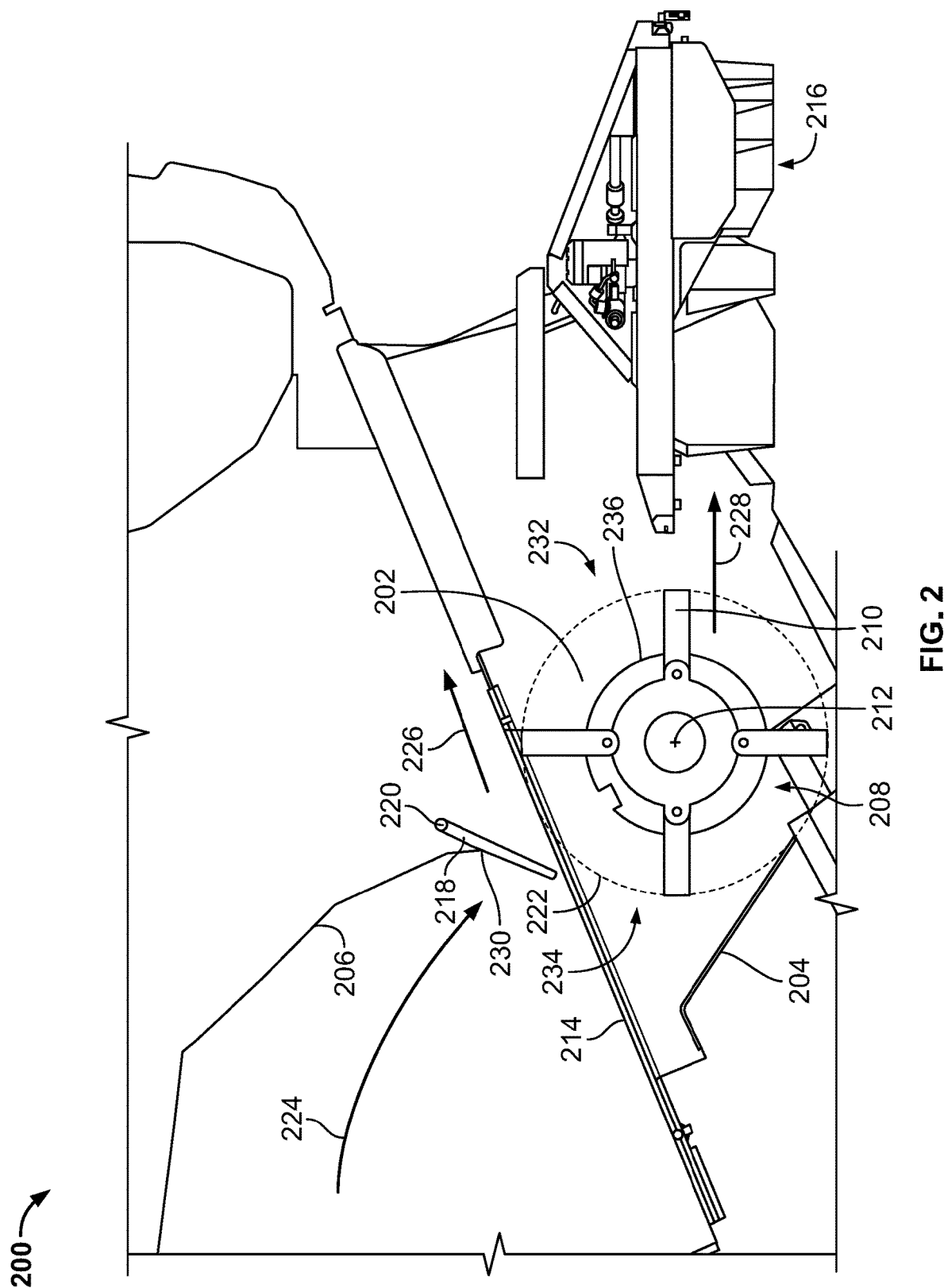
FIG. 2 is a partial section of a side view of a rear portion of a combine with a residue deflector in a first position.

Referring to FIG. 2, a rear portion of a combine 200 is shown. In particular, a chopper housing 232 and a chopper rotor assembly 208 are illustrated. The chopper housing 232 may be formed of a pair of opposing side walls 202. In FIG. 2, only one side wall 202 is shown and the other is removed to better illustrate the features of the combine inside of the chopper housing 232. In addition to the side walls 202, the housing may include a floor or inlet floor 204. The inlet floor 204 may be angled or declined such that air is able to flow over the inlet floor 204 and into the chopper rotor assembly 208. The inlet floor 204 defines a portion of an inlet to the chopper rotor assembly 208.

The combine 200 may include a roof or rear hood 206 which is disposed forward of the chopper rotor assembly 208. Air from the separating section 44 and the sieves 48, 50 may be directed into contact or toward the rear hood 206. As shown, the rear hood 206 may be angled or oriented in a downward and rearward direction in FIG. 2 thereby directing the air flow towards the inlet of the chopper rotor assembly 208.

The combine 200 may further include a pair of rails 214 mounted to the side walls of the combine. The side walls 202 of the chopper housing 232 may be complementary with and generally coplanar with the side walls of the combine 200. In other words, the chopper housing 232 may have a similar width as that of the combine 200, but the chopper housing 232 is able to slide along the rails which are mounted to the combine. The chopper housing 232 may be movably coupled to the rails 214 such that the chopper housing 232 may move therealong relative to the combine 200. This may be necessary during service of the chopper housing 232, or if a different residue distribution is desired. An actuator (not shown) may be used to move the chopper housing 232 along the rails 214. The actuator may be any type of known actuator such as an electric actuator, mechanical actuator, hydraulic actuator, electro-hydraulic actuator, and the like. The actuator may be controlled by an operator from the cab 16 of the combine, remotely from another location on the combine or from a location remote from the combine 200.

The chopper rotor assembly 208 may include a chopper rotor 236 formed of a central hub and a plurality of blades 210 coupled thereto and protruding radially therefrom. The chopper rotor 236 is disposed within the chopper housing 232 and may rotate in a counterclockwise direction about a pivot axis 212. As shown, the outer tips of the plurality of blades 210 define an outer circumference 222 or boundary during rotation. Although not shown in FIG. 2, in one embodiment the chopper rotor assembly 208 may also include one or more stationary blades affixed to the inlet floor 204 of the chopper housing 232. In this embodiment, the stationary blades may be arranged in a direction of the width of the chopper rotor 236 and spaced accordingly such that the stationary blades do not come into contact with the blades 210 of the chopper rotor 236. Interaction between the plurality of blades 210 of the chopper rotor 236 and the stationary blades can create a chopping action. In the illustrated embodiment of FIG. 2, however, there are no stationary blades shown and this may be the case for at least this embodiment.

As material is chopped by the chopper rotor 236, the material or residue is blown further rearward until it is engaged by a spreader 216. The spreader 216 may include one or more blades or paddles for spreading the material rearward of the combine 200 where the material may be collected or picked up by another machine or vehicle. Any known type of spreader may be used for purposes of this disclosure.

As previously described relative to the '315 patent, some conventional combines include a rear hood with vents formed therein. The '315 patent, for example, describes rear vents defined in the rear hood upstream of the chopper rotor. While the vents are designed to allow air to escape from the enclosed combine, at least in some cases only a small portion of the air is able to vent thereby still restricting air flow out of the combine and thus back pressure continues to build therein.

To overcome this and referring again to FIG. 2, the present disclosure does not include any rear vents defined in the rear hood similar to those in the '315 patent. In other words, there is no means for venting air from the enclosed combine 200 upstream of the chopper rotor assembly 208. Instead, air flow is able to exit from the enclosed combine through a gap defined between the chopper rotor assembly 208 and a rearmost edge 230 of the rear hood 206, and also through the chopper rotor 236. As shown, air generated by the blower 46 may follow a first portion of a flow path defined by arrow 224. The flow path may partially be defined along the rear hood 206 and it also may flow along the floor inlet 204. The entirety of the air flow from the blower passes through the inlet 234 of the chopper rotor 236, which is contrary to the design described in the '315 patent. Air may flow through the inlet 234 through the air gap, d, defined between the rearmost edge 230 of the rear hood 206 and the circumferential path 222 traveled by the outermost edge of the plurality of blades 210 of the chopper rotor 236. As shown in FIG. 2, the air may flow along a second portion of the flow path defined by arrow 226 above the chopper rotor 236.

It is noteworthy that the flow path defined by arrow 226 is possible because the chopper housing 232 does not include a shroud or section of sheet material that wraps around the top and rear portions of the chopper rotor 236. Instead, the chopper housing 232 is open both above and to the rear of the chopper rotor 236 to permit air flow to escape the combine from within. This open-style chopper housing 232 reduces or prevents back flow of air and thus reduces or eliminates back pressure from building inside the combine housing.

The gap, d, formed in the chopper housing 232 of FIG. 2 may be several inches in width. In one non-limiting example, the gap may be between 2-10 inches. In another non-limiting example, the gap may be approximately 3-5 inches. In any event, the gap is significant enough to allow air to escape the combine by bypassing the chopper rotor 236 and flowing through the gap defined above the chopper rotor 236. Moreover, due to the weight of the residue, all or a majority of the residue still passes through the chopper rotor 236 and is chopped by the plurality of blades 210 before being discharged from the outlet of the housing. It may be possible that a small portion of the residue is discharged out of the housing by the air stream flowing through the gap, d, but this is a small amount compared to that which is chopped by the chopper rotor 236. Further, the downward and rearward angle of the rear hood 206 as shown in FIG. 2 further facilitates the transport of the residue into the inlet 234 of the chopper rotor 236 to be chopped and discharged therefrom.

In addition to allowing air to flow above the chopper rotor 236 along flow path 226, the embodiment of FIG. 2 further allows and promotes air flow through the chopper rotor 236. This is shown via a third flow path identified by arrow 228 in FIG. 2. Conventional combines, such as the one described in the '315 patent, allow some air to escape from inside the combine but only through a portion of the chopper rotor. One reason for this is because most conventional chopper rotors utilize fan blades across the width of the chopper rotor. These fan blades, also commonly referred to as wing knives or wing blades, rotate in a counterclockwise direction. Thus, as air is directed by the blower to the conventional chopper rotor, the fan blades are designed with a portion of the blade bent at nearly a right angle to generate an additional air stream. In other words, as the conventional chopper rotor rotates in the counterclockwise direction, the fan blades at approximately the 9 o'clock position are able to push the air out of the combine due to the bent portion. These fan blades are able to push the air out of the combine from roughly the 9 o'clock position to approximately the 5 o'clock position.

However, for roughly 50-65% of the rotational path of each blade, the air is pushed by these blades forward back into the combine. For example, from approximately the 5 o'clock position and rotating counterclockwise to the 9 o'clock position, the fan blades direct the air forward and back into the combine, thus reducing or preventing a significant portion of the air flow from escaping from the combine. This forward pushing of the air by the chopper rotor fan blades is further exacerbated by the shape of the chopper housing in the '315 patent, and particularly how it wraps around the top and rear of the chopper rotor in close proximity to the circumferential path traveled by the blades. This design of the chopper housing and use of fan blades therefore requires the rear and side vents as shown and described in the '315 patent.

Figure 8:
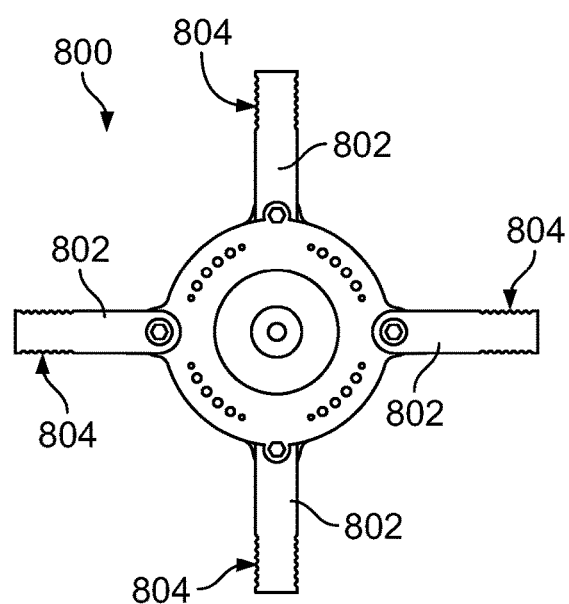
FIG. 8 is a front view of a first embodiment of a chopper rotor assembly.

In the present disclosure, the combine 200 of FIG. 2 is shown and described as having an open-style chopper housing 232 with a sizeable gap defined between the rear hood 206 of the combine 200 and the chopper rotor 236. In addition, the present disclosure further provides for air flow to pass through the chopper rotor 236 where the blades 210 do not inhibit the air flow or produce an additional air stream. The air is therefore able to escape through the chopper rotor 236 as well as above it. This may be achieved by the chopper rotor assembly 208 having substantially thin, flat blades similar to those shown in FIG. 8. In FIG. 8, one embodiment of a chopper rotor 800 is illustrated having a central hub and an axis by which a plurality of thin, flat blades 802 are attached. The blades 802 may include a sharpened portion 804 with teeth for performing a chopping function. Each blade 802 may be substantially straight, and unlike the fan blades, there is no portion of these blades 802 that is bent or turned at an angle to promote air movement. Since these blades 802 are designed as being thin and having a substantially flat and straight profile, rotation of the blades 802 about the rotation axis of the chopper rotor 800 does not promote or push air in any direction, but instead only performs the chopping function. Thus, air flow through the chopper rotor 800 is possible in a substantially rearward direction without the blades 802 generating an additional air stream due to their substantially flat profile.

The embodiments of FIGS. 2 and 8 of the present disclosure therefore promotes air flow through the gap, d, defined above the chopper rotor 236 and also through the chopper rotor 236. There is no venting arrangement defined upstream of the chopper rotor 236 as is commonly found in conventional combines such as the one described in the '315 patent. Moreover, the open-style chopper housing 232 allows air to escape without passing through the chopper rotor 236, and there is no restriction of air flow which is commonly found in conventional combines. Thus, the combine 200 of FIG. 2 with the chopper rotor of FIG. 8 provides an improvement over conventional combines.

Figure 9:
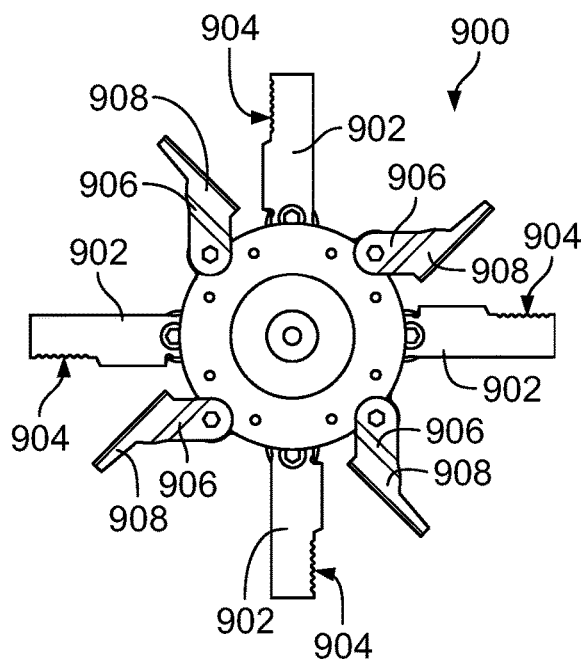
FIG. 9 is a front view of a second embodiment of a chopper rotor assembly.

In an alternative embodiment, a chopper rotor assembly 208 may include a chopper rotor 900 similar to the one depicted in FIG. 9. Here, the chopper rotor 900 is shown with a plurality of thin, flat blades 902 similar to those in FIG. 8. These thin, flat blades 902 may be substantially straight and include at least a portion of one surface having a sharpened portion 904 with a plurality of teeth for performing a chopping function. In addition to the plurality of chopper blades 902, the chopper rotor 900 may also include at least one fan blade 906. Although four fan blades 906 are shown in FIG. 9, another embodiment of the chopper rotor 900 may only include a single fan blade 906. An alternative embodiment of the chopper rotor 900 may include several fan blades 906 spaced along the width of the chopper rotor 900. In any event, the at least one fan blade 906 may include a bent portion 908 that may perform an air moving function (i.e., generate an additional air stream). The bent portion 908 may be angled at approximately 90°, but the angle of the bent portion 908 may be predisposed at any desirable angle. In some embodiments, the angle may be relatively small (e.g., less than 10°) so that the chopper rotor 900 does not push a significant amount of air forward into the combine and create back pressure therein.

In one embodiment of the present disclosure, the combine may include a pivotable shaft with a panel of sheet metal attached thereto that is capable of preventing or reducing an amount of material or crop from being thrown forward back into the cleaning system 28. This may be similar to the aforementioned wall 68 in FIG. 1. When harvesting crop such as corn, the chopper rotor may occasionally throw crop and other residue in a forward direction over the top of the rotor and back into the cleaning system 28. This can cause damage upon impact with the cleaning system since the rotor blades can spin at a high rotational speed. Many conventional combines avoid this from happening by placing a top wall 68 in close proximity to the top of the chopper rotor. An example of this is shown in the '315 patent. However, as described above, this arrangement can substantially inhibit air flow from escaping the combine.

Figure 3:
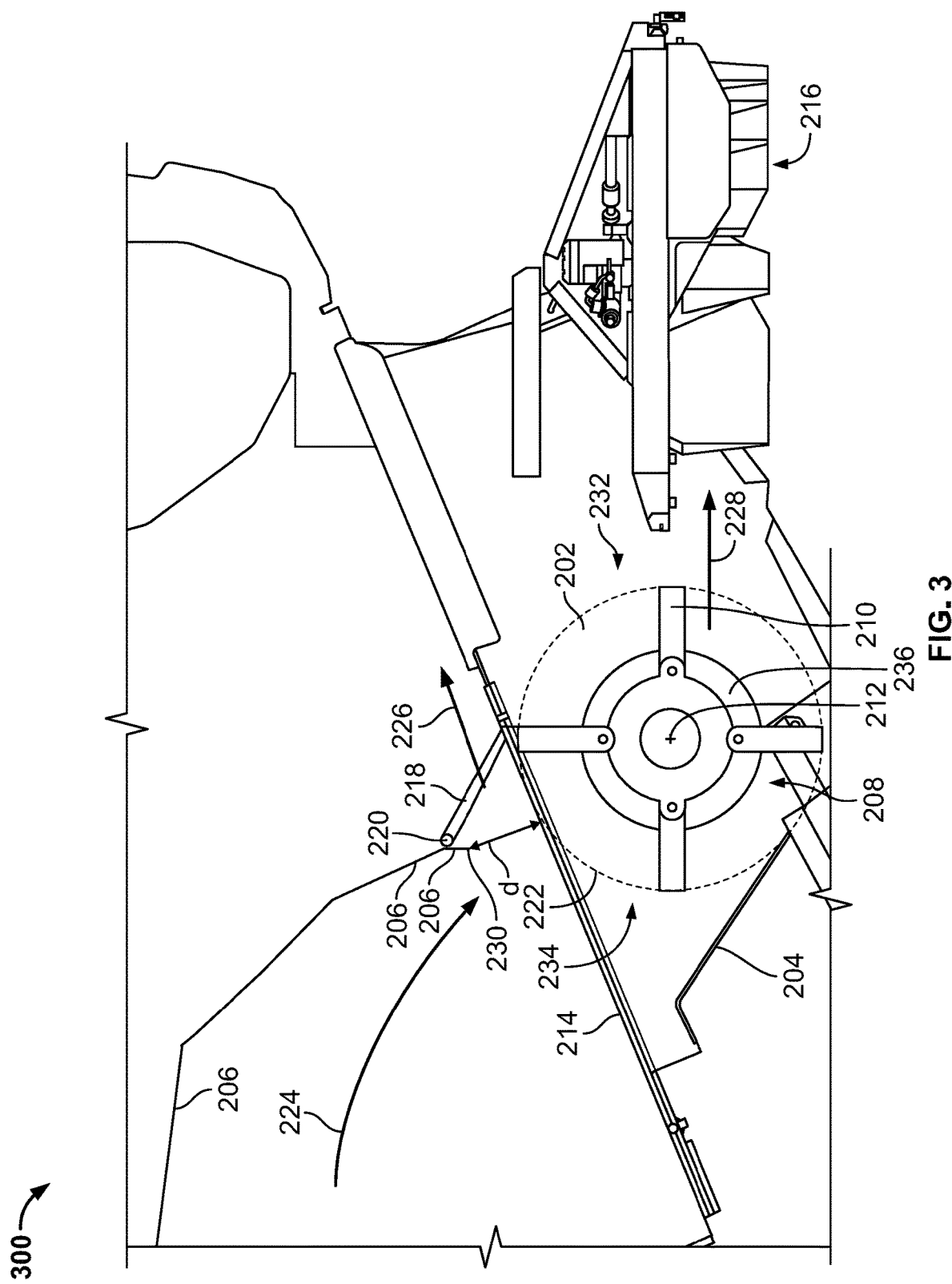
FIG. 3 is another partial section of a side view of a rear portion of a combine with a residue deflector in a second position.
Figure 4:
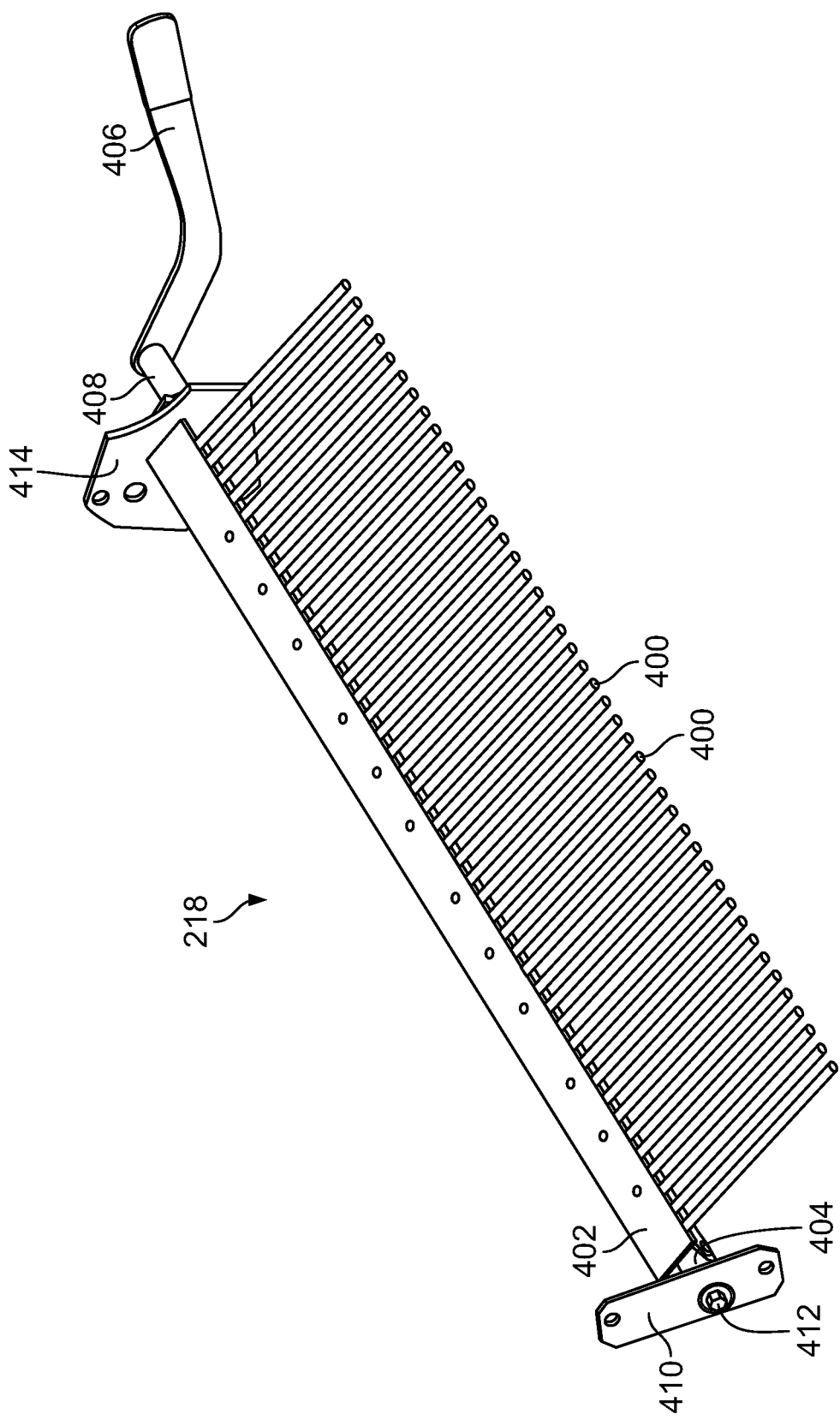
FIG. 4 is a side perspective view of a residue deflector assembly.

In the present embodiment, when material is thrown in the forward direction by the chopper rotor 236, it may contact the sheet metal and fall down back into the chopper rotor 236 where it is directed rearward and out of the combine. While the metal sheet is effective at preventing crop from being flung back into the cleaning system area, it may reduce or inhibit air flow over the top of the chopper rotor 236. Thus, to overcome this, another embodiment of the present disclosure is illustrated in FIGS. 2-4. In FIG. 2, for example, the combine 200 may include a residue deflector 218. The residue deflector 218 may span the width of the combine or chopper housing 232, and it may pivot between at least two positions.

In FIG. 2, the residue deflector 218 is shown pivoted in a first position or orientation. The residue deflector 218 may include a pivot rod 220 about which the residue deflector is connected. In the first position of FIG. 2, the residue deflector 218 is pivoted in a forward direction toward the cleaning system 28. In this orientation, the residue deflector 218 is disposed such that any crop or material thrown by the chopper rotor toward the cleaning system 28 may come into contact with the residue deflector 218. Upon contacting the residue deflector 218, the crop or other material may fall or slide down and be picked up or carried by the air flow and directed back into the chopper rotor 236.

As shown in FIG. 3, the residue deflector 218 may be oriented in the second position 300. In this position, the residue deflector 218 may be pivoted rearward and, in some cases, a more generally upward direction. When harvesting wheat, for example, the residue deflector 218 may be disposed in the second position 300.

One example of the residue deflector 218 is shown in FIG. 4. In this example, the residue deflector 218 may include a plurality of tines or fingers 400 which are supported by a plate 402 and pivot rod 404. By pivoting the rod 404, the tines or fingers 400 may pivot between the at least two positions described above. At one end of the residue deflector 218 is a mounting bracket 410. The mounting bracket 410 may include several openings for coupling the bracket 410 to the combine side walls. Moreover, another opening in the bracket 410 allows a fastener 412, bushing, or other coupling means to couple the pivot rod 404 to the mounting bracket 410. The fastener 412 may include a bolt, screw, washer, nut, or any other known type of fastener.

At an opposite end of the mounting bracket 410 is a detent plate 414. The detent plate 414 may include at least two defined positions in which the residue deflector 218 may be pivoted into. To control movement of the residue deflector 218, a handle 406 may be provided. The handle 406 may be coupled to the pivot rod 404 via a crank arm 408. The handle 406 may be manually actuated to pivot the residue deflector 218 between its two or more positions. The handle 406 may include a special grip or other feature at an end thereof to provide a better grip when manually actuating the handle 406.

Figure 7:
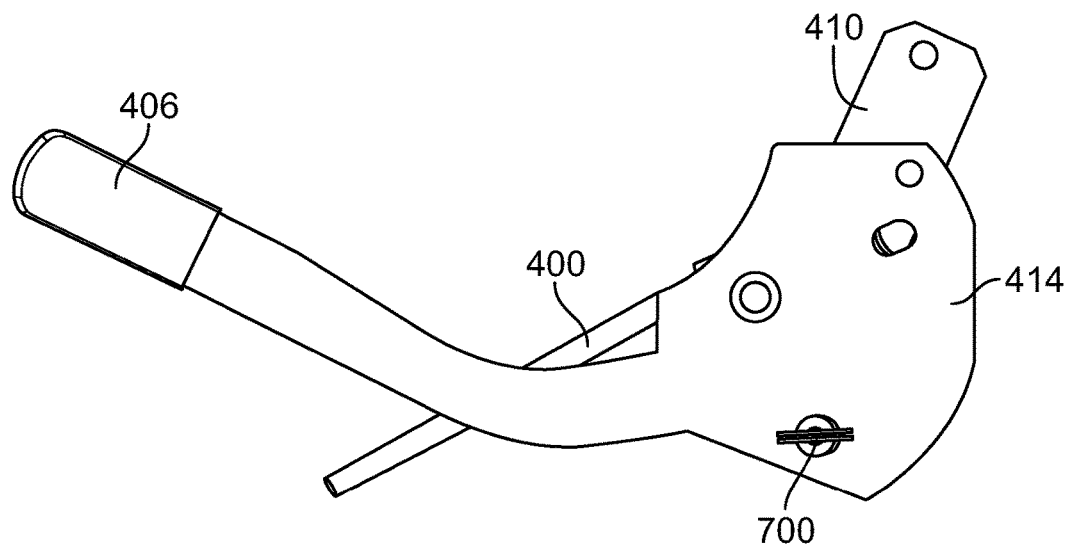
FIG. 7 is a partial side view of the residue deflector assembly of FIG. 4.

In order to manually actuate the handle, there may be provided a bushing a spring pin 700 as shown in FIG. 7. The spring pin 700 may be used to lock the handle 406 in a desired position. Detents or tracks may be defined in the detent plate 414 to further lock the handle and thus the residue deflector 218 in a particular position or orientation. To unlock the handle 406 from a detent position, the spring pin 700 may be pulled in an outward direction thereby releasing the handle 406 for movement. The pin 700 may be pushed back in to lock the handle 406 again in its new detent position.

As described above, at least one position may be desirable for harvesting straw and at least another position may be desirable for harvesting other grain such as wheat. The first position as shown in FIG. 2, for example, is a forward position that is more desirable when harvesting corn. The second position 300 shown in FIG. 3, i.e., the rearward oriented position, may be desirable for cereal, wheat or other bushy crop. In this second position 300, the residue deflector 218 may be folded rearward and upwardly so as to not inhibit material flow in either the forward or rearward direction.

In an alternative embodiment which is not shown, it is contemplated by this disclosure that the pivotable control of the residue deflector 218 may be automated or otherwise controlled by a combine operator from the cab 16. For example, a controller may be provided for controlling an actuator which pivots the residue deflector 218 between its at least two positions. The actuator may be an electric actuator, a mechanical actuator, a hydraulic actuator, an electro-hydraulic actuator, or any other known type of actuator. Moreover, a control (e.g., control button, switch, lever, joystick, etc.) may be provided in the cab for controlling the position of the residue deflector 218 from a location remote from the deflector. The operator may manipulate the control to send a signal to the controller, which in turn controls the actuator to move or pivot the residue deflector in accordance with the signal from the control. This automation may improve machine downtime and allow for improved performance.

In the embodiment of FIG. 4, the residue deflector 218 may form a comb-like structure in which the plurality of tines 400 are spaced from one another to allow for adequate air flow therebetween. In other words, air flow over the top of the chopper rotor 236 and through the gap, d, may further flow between the plurality of tines 400 of the residue deflector 218. Thus, air is freely able to flow over the chopper rotor 236 and through the residue deflector 218 via flow path 218. Air is further able to escape from the combine by passing through the chopper rotor 236 via flow path 228, as described above. Further, the tines 400 may be closely spaced so that crop and other material that is throw in the forward direction by the chopper rotor 236 comes into contact with the plurality of tines 400 and falls downward back into the chopper rotor 236. This is particularly the case when the residue deflector 218 is disposed in the downward and forward position of FIG. 2.

Figure 5:
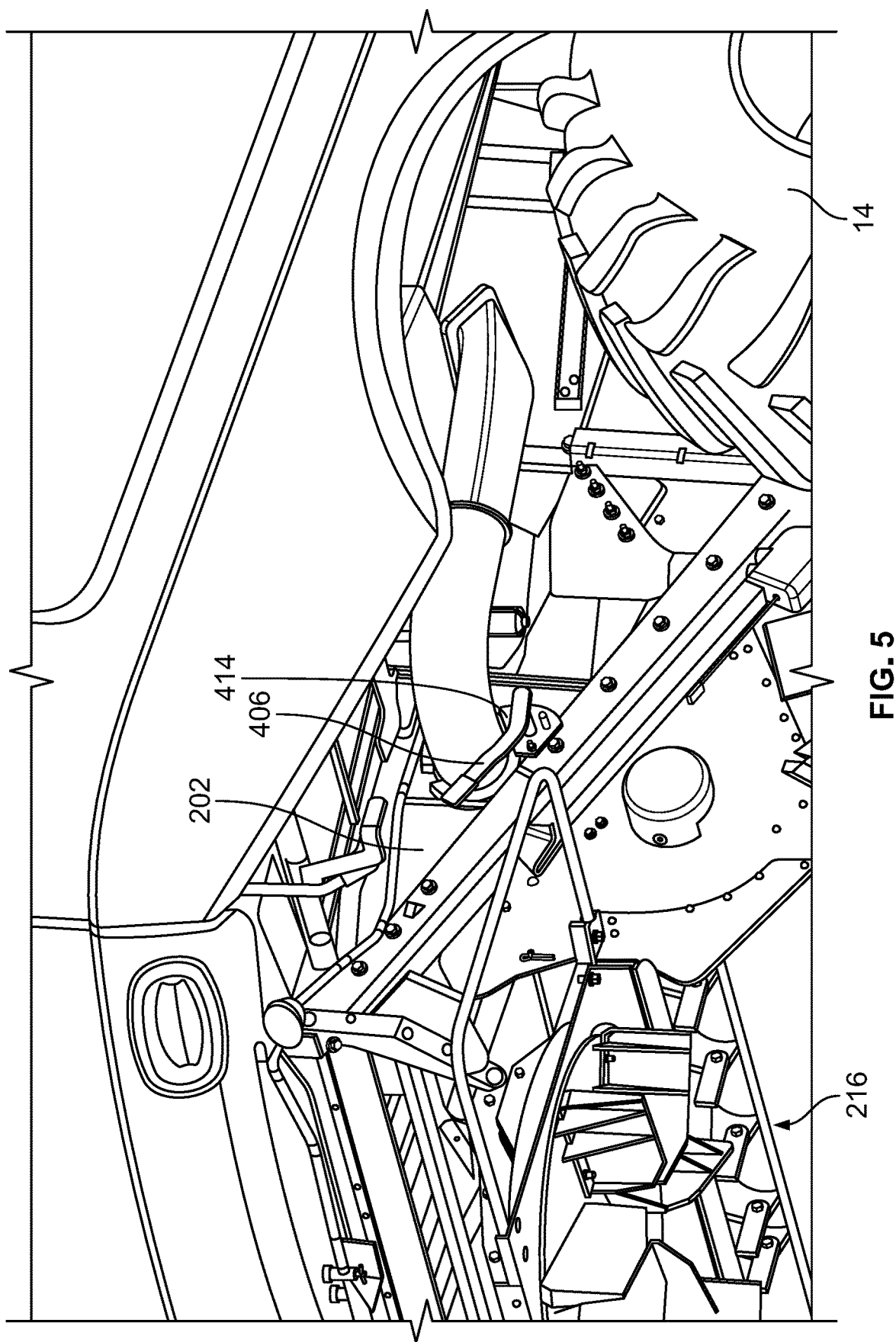
FIG. 5 is a rear side perspective view of a rear portion of the combine of FIGS. 2 and 3.
Figure 6:
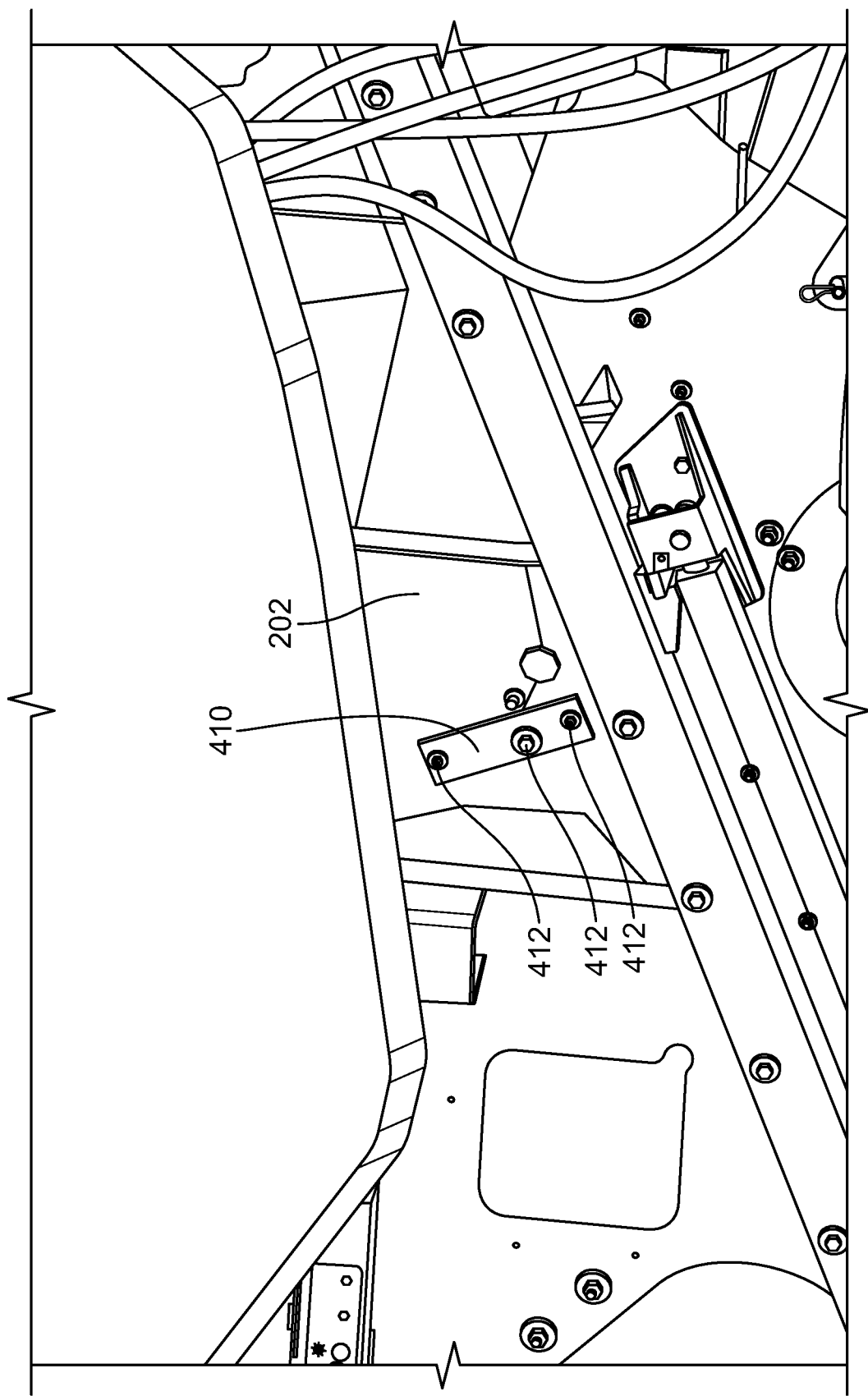
FIG. 6 is a side perspective view of the rear portion of the combine of FIGS. 2 and 3.

In FIGS. 2-6, the residue deflector 218 may be supported by and coupled to each side wall of the combine. As shown in FIG. 5, the detent plate 414 may be coupled to one side wall of the combine. In FIG. 6, the mounting bracket 410 is shown coupled to an opposite side wall of the combine. Here, the pivot rod 404 may pass through an oversized opening in the side wall of the combine, and the mounting bracket 410 further couples the pivot rod 404 to the side wall with a tighter tolerance.

While the residue deflector 218, and in particular the pivot rod 404, are described as being coupled to the side walls of the combine, in a further embodiment the pivot rod 404 may be coupled to the side walls 202 of the chopper housing 232. In any event, the residue deflector 218 may be pivotably coupled to either the side walls of the combine or the chopper housing 232, and it spans the width of the combine or chopper housing 232.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A combine harvester, comprising:
   a housing including a rear hood and opposite side walls which define an interior;
   a blower disposed in the interior of the housing, the blower configured to generate an air stream in a substantially rearward direction;
   a cleaning system disposed in the interior at a location rearward from the blower, the cleaning system separating residue from a crop material such that the residue is transported via the air stream rearwardly to be discharged from the housing;
   a chopper rotor assembly disposed within the interior at a location below the rear hood of the housing, the chopper rotor assembly comprising a chopper rotor mounted about a hub for rotation about an axis defined by the hub and a plurality of blades coupled to the hub of the chopper rotor for chopping the residue as it is received via the air stream;
   each of the plurality of blades being substantially straight and comprising a substantially flat profile so as to chop the residue without producing an additional air stream as the chopper rotor rotates about the hub;
   a chopper housing disposed within the interior and defining an inlet opening of the chopper rotor assembly for receiving the residue and an outlet spaced rearward from the chopper rotor for discharge of the chopped residue from the interior of the housing; and
   an air gap defined between a rearmost portion of the rear hood and the chopper rotor;
   wherein, the air stream generated by the blower flows out of the interior in the rearward direction via at least a first flow path and a second flow path, the first flow path being defined through the chopper rotor such that a first portion of the air stream flows via the first flow path through the chopper rotor without being substantially redirected by the plurality of flat profile blades of the chopper rotor, and the second flow path is defined through the air gap above the chopper rotor such that a second portion of the air stream exits the interior via the second flow path; and
   further comprising a residue deflector pivotably coupled to the side walls of the housing at a location rearward of the rear hood and above the chopper rotor, the residue deflector being pivotable between at least a first position and a second position.

2. The combine harvester of claim 1, wherein the chopper housing is substantially open above and to the rear of the chopper rotor.

3. The combine harvester of claim 1, further comprising at least one fan blade coupled to the hub of the chopper rotor, the at least one fan blade including a bent portion for generating an additional air stream in the interior of the housing.

4. The combine harvester of claim 1, wherein the residue deflector comprises a rod pivotably coupled to the side walls of the combine and a plurality of tines depending from the rod and into at least a portion of the air gap above the chopper rotor, the plurality of tines being spaced from one another along a width of the residue deflector to allow the second portion of the air stream to flow via the second flow path between the plurality of tines.

5. The combine harvester of claim 1, wherein the residue deflector is oriented in a downward and forward direction in the first position, and in a rearward direction in the second position.

6. The combine harvester of claim 1, wherein the chopper housing comprises a floor and a pair of side walls opposite one another but is open at the top and rear of the chopper rotor to permit the air stream to flow substantially unrestricted out of the interior.

7. The combine harvester of claim 1, wherein the rear hood is free of any opening or vent such that the air flow is directed rearward via the rear hood without escaping from the interior upstream of the chopper rotor.

8. The combine harvester of claim 3, wherein the side walls of the housing do not include any vents upstream of the chopper rotor for venting the air stream from the interior.

9. The combine harvester of claim 1, wherein the chopper rotor does not include any fan blades coupled to the hub.

10. A combine harvester, comprising:
    a housing including a rear hood and opposite side walls which define an interior;
    a chopper rotor assembly disposed within the interior at a location below the rear hood of the housing, the chopper rotor assembly comprising a chopper rotor mounted about a hub for rotation about an axis defined by the hub and a plurality of blades coupled to the hub of the chopper rotor for chopping residue as it is received via an air stream upstream of the chopper rotor;
    a chopper housing disposed within the interior and defining an inlet opening of the chopper rotor assembly for receiving the residue via the air stream and an outlet spaced rearward from the chopper rotor for discharge of the chopped residue from the interior of the housing; and
    an air gap defined between a rearmost portion of the rear hood and the chopper rotor;
    wherein, the air stream passes through the rotor inlet of the chopper rotor and flows out of the interior in the rearward direction via at least a first flow path and a second flow path, the first flow path being defined through the rotor inlet of the chopper rotor such that a first portion of the air stream flows via the first flow path through the rotor inlet of the chopper rotor without being substantially redirected by the plurality of flat profile blades of the chopper rotor, and a second portion of the air stream flows via the second flow path through the air gap above the chopper rotor such that a second portion of the air stream exits the interior via the second flow path;

further wherein, the rear hood is free of any opening or vent such that the air stream is directed rearward via the rear hood without escaping from the interior upstream of the chopper rotor; and further comprising a residue deflector pivotably coupled to the side walls of the housing or the chopper housing at a location rearward of the rear hood and above the chopper rotor, where the residue deflector is pivotable between at least a first position and a second position.

11. The combine harvester of claim 10, wherein each of the plurality of blades being substantially straight and comprising a substantially flat profile so as to chop the residue without producing an additional air stream as the chopper rotor rotates about the hub.

12. The combine harvester of claim 10, wherein the side walls of the housing do not include any vents upstream of the chopper rotor for venting the air stream from the interior.

13. The combine harvester of claim 10, wherein the chopper rotor does not include any fan blades coupled to the hub.

14. The combine harvester of claim 10, wherein the residue deflector is oriented in a downward and forward direction in the first position, and in a rearward direction in the second position.

15. The combine harvester of claim 10, wherein the residue deflector comprises a rod pivotably coupled to the side walls of the combine and a plurality of tines depending from the rod and into the space defined between the rear hood and the chopper rotor, the plurality of tines being spaced from one another along a width of the residue deflector to allow the second portion of the air stream to flow via the second flow path between the plurality of tines.

16. The combine harvester of claim 15, further comprising:
    a mounting bracket for coupling one end of the rod to a first side wall of the housing;
    a detent plate for coupling the other end of the rod to a second side wall of the housing; and
    a handle coupled to the rod for manipulating the residue deflector between its at least two positions.

17. The combine harvester of claim 15, further comprising:
    a controller; and
    an actuator coupled to the residue deflector, the actuator being operably controlled by the controller for controlling the pivotable movement of the residue deflector between its at least two positions.

18. The combine harvester of claim 10, wherein the chopper housing comprises a floor and a pair of side walls opposite one another but is open at the top and rear of the chopper rotor to permit the air stream to flow substantially unrestricted out of the interior.

* * * * *